(12) United States Patent
Richardson

(10) Patent No.: US 12,522,062 B2
(45) Date of Patent: Jan. 13, 2026

(54) ELECTRIC RACE CAR

(71) Applicant: Bruce Richardson, Los Gatos, CA (US)

(72) Inventor: Bruce Richardson, Los Gatos, CA (US)

( * ) Notice: Subject to any disclaimer, the term of this patent is extended or adjusted under 35 U.S.C. 154(b) by 313 days.

(21) Appl. No.: 18/199,689

(22) Filed: May 19, 2023

(65) Prior Publication Data

US 2024/0383322 A1   Nov. 21, 2024

Related U.S. Application Data

(60) Provisional application No. 63/343,552, filed on May 19, 2022.

(51) Int. Cl.
| | |
|---|---|
| *B60K 1/02* | (2006.01) |
| *B60K 1/00* | (2006.01) |
| *B60K 1/04* | (2019.01) |
| *B60K 11/02* | (2006.01) |
| *B60K 11/06* | (2006.01) |
| *B60L 50/60* | (2019.01) |

(52) U.S. Cl.
CPC ............. *B60K 1/02* (2013.01); *B60K 1/04* (2013.01); *B60K 11/02* (2013.01); *B60K 11/06* (2013.01); *B60L 50/66* (2019.02); *B60K 2001/005* (2013.01); *B60K 2001/006* (2013.01)

(58) Field of Classification Search
CPC ............. B60K 1/02; B60K 2001/005; B60K 2001/006; B60K 2001/0466; B60K 11/02; B60K 11/06; B60L 50/66
See application file for complete search history.

(56) References Cited

U.S. PATENT DOCUMENTS

2006/0070790 A1*  4/2006  Kejha ................. B60K 6/52
                                                    180/311
2024/0130289 A1*  4/2024  Sugimura ............. A01D 34/78

* cited by examiner

*Primary Examiner* — Huan Le
(74) *Attorney, Agent, or Firm* — THE KLINE LAW FIRM; Keith Kline

(57) ABSTRACT

The disclosure above teaches a race car that utilizes electrical power for the drive train. The car uses two distinct power packs, or batteries. Power from each battery is transferred to one of the rear wheels, thereby creating a twin drive system. The race car further includes at least two receptacles that receive a battery or battery pack, preferably from above, thereby enabling vertical drop-in installation of the batteries. The battery receptacles include mechanisms to protect the interior (and therefore the driver) of the vehicle. The protective mechanisms of the battery receptacles further serve to isolate the batteries from the interior of the race car so that if the integrity of the battery casing is compromised, corrosive materials from the batteries are inhibited from coming into contact with other components of the car and/or the driver of the car.

20 Claims, 15 Drawing Sheets

ELECTRIC RACE CAR

CROSS REFERENCE TO RELATED APPLICATIONS

This application claims the priority benefit of US Provisional Application 63/343,552, filed May 19, 2022, inventor Bruce Richardson, for "ELECTRIC RACE CAR".

FIELD OF THE PRESENT DISCLOSURE

The present disclosure teaches a race car design, specifically an electric race car utilizing drop-in batteries, wherein power is transferred to the wheels via twin drive systems.

SUMMARY

The race car disclosed herein includes electrical power for the drive train. The car uses two distinct power packs, or batteries. Power from each battery is transferred to one of the rear wheels, thereby creating a twin drive system.

The race car further includes at least two receptacles that receive a battery or battery pack, preferably from above, thereby enabling drop-in installation of the batteries. The battery receptacles include mechanisms to protect the interior (and therefore the driver) of the vehicle. The protective mechanisms of the battery receptacles further serve to isolate the batteries from the interior of the race car so that if the integrity of the battery casing is compromised, corrosive materials from the batteries are inhibited from coming into contact with other components of the car and/or the driver of the car.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
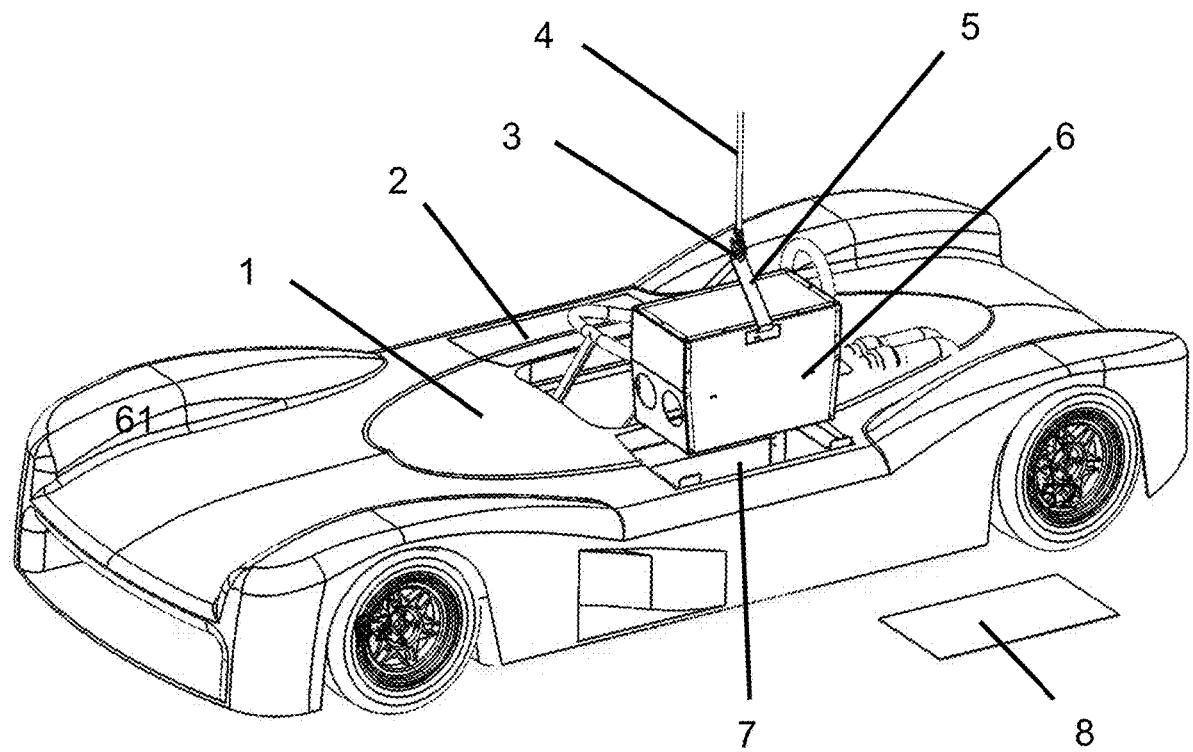
FIG. 1 is a perspective view of an electric race car according to the present disclosure, with a battery unit being installed therein.

The present disclosure describes an electric race car 1 as illustrated in FIG. 1. The race car 1 is powered by at least a pair of electric motors. Each electric motor is powered by an associated electrical power source, typically a battery assembly 6 that is received in a battery receptacle 7. Each battery receptacle 7 is covered by a battery cover when the car 1 is in operation. The right side cover 2 is shown in place on the body of the race car 1. The left side cover 8 is shown as removed from the car body for the battery replacement operation. In various preferred embodiments, the battery receptacles 7 are oriented to receive batteries from above, so that a vertical drop-in battery swap is enabled.

When a battery swap is required, the associated battery cover is removed, and a lift bracket 5 is attached to the battery assembly 6. The battery assembly 6 is raised and lowered via a battery lifting cable 4 that is connected to the lift bracket 5 by a lifting hook 3. Those skilled in the art will recognize that any number of winching mechanisms can be employed to raise and lower the battery assemblies 6 once the lift bracket 5 is affixed to the lifting cable via the lifting hook 3.

Figure 2:
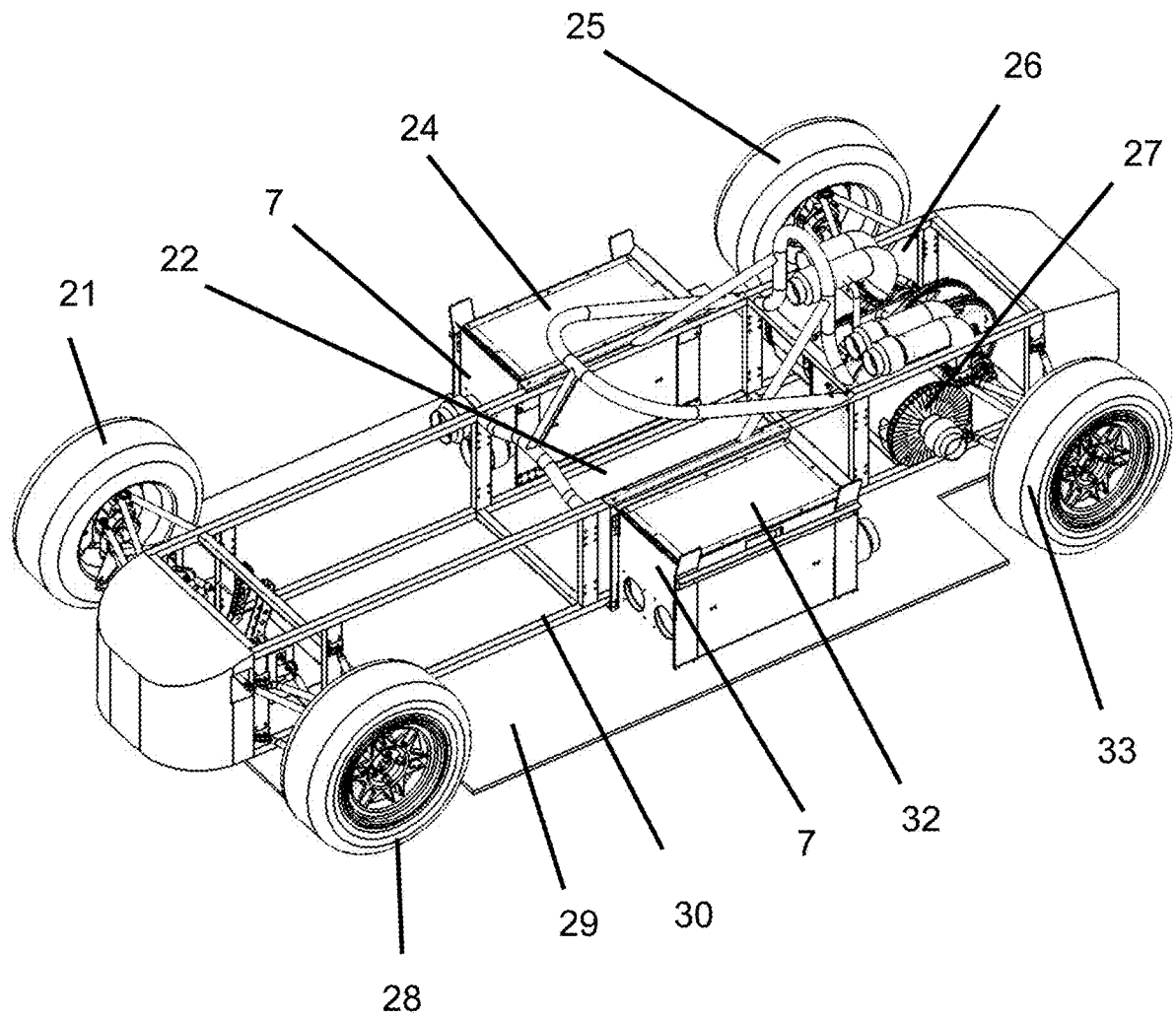
FIG. 2 is a perspective view of the electric race car with the body shell removed.

In FIG. 2, the chassis of the race car 1 is visible with the body of the car removed. In the middle area of the chassis, a driver seating location 22 is visible. The seating location will of course include the necessary restraint mechanisms required for auto racing. Also visible in FIG. 2 is the power source for the car, the batteries including a right side battery 24 and a left side battery 32. The batteries 24, 32 are received in the left and right side battery receptacles 7.

Figure 3:
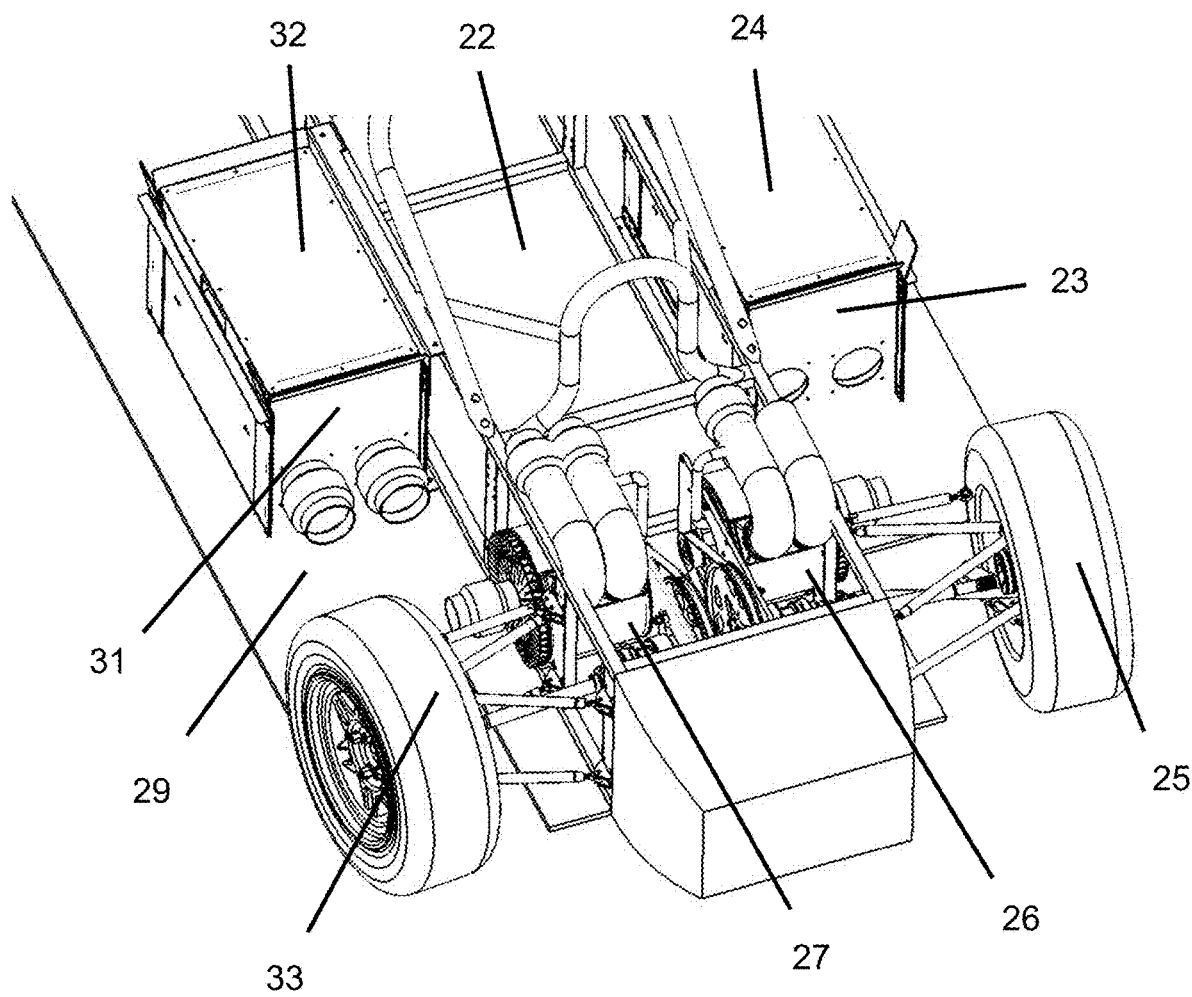
FIG. 3 shows the rear of the car with the body shell removed.

Also visible in FIG. 2 are the combinations of suspension mechanisms and wheels—right front 28, left front 21, right rear 25, and left rear 33. A floor pan 29 of the body is connected to the frame 30. As depicted in FIG. 2, the right rear wheel is powered by a right side motor and drive assembly 26, and the left rear wheel is powered by a corresponding left side motor and drive assembly 27. FIG. 3 shows many of the same components as FIG. 2, but from a top front perspective.

Because the motor and drive assemblies 26, 27 transmit power to the wheels of the car 1 via a direct drive configuration, no differential is required. This allows the elimination of the weight required in current art cars for the differential, thereby reducing overall weight of the race car 1.

Figure 4:
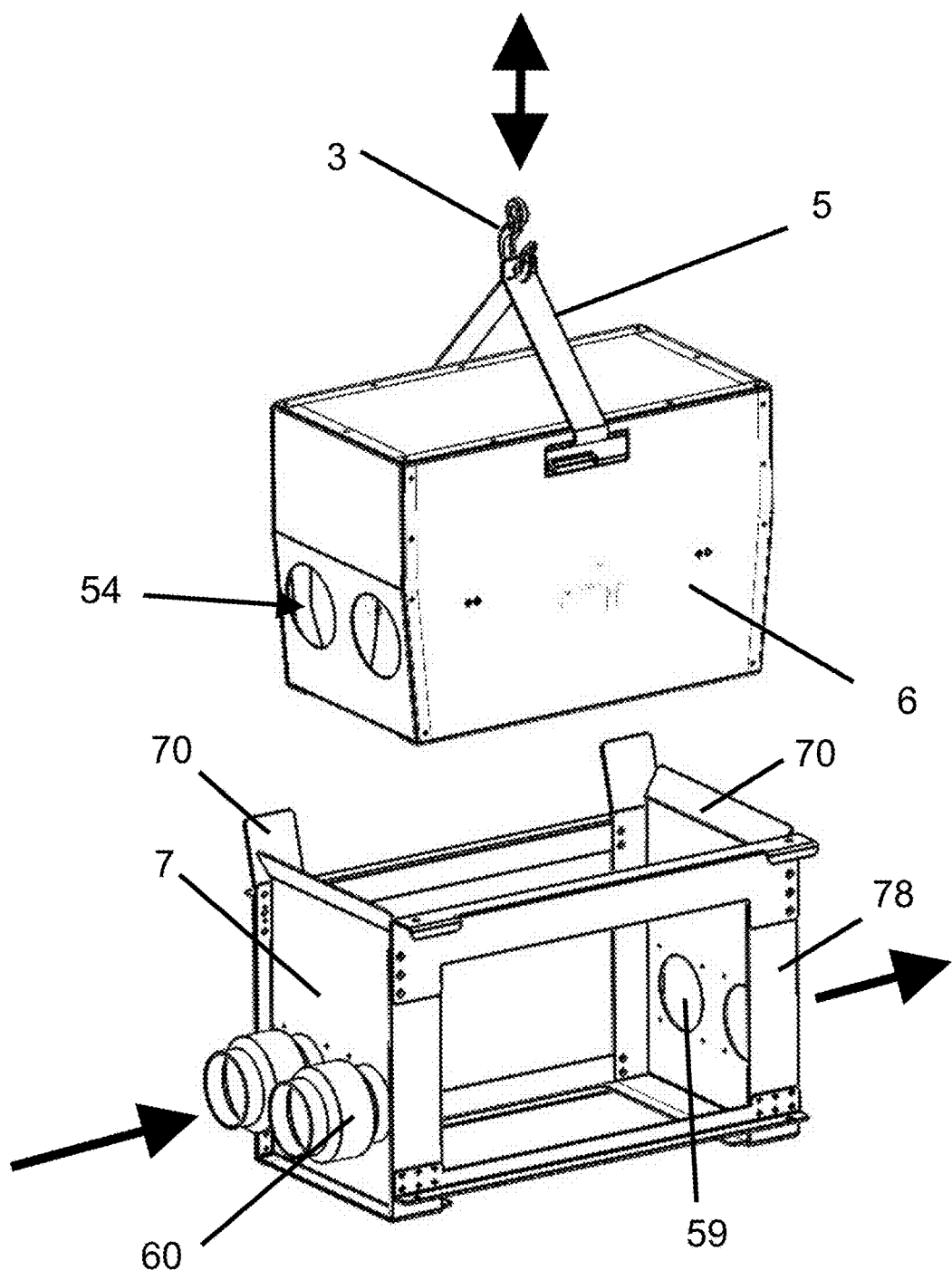
FIG. 4 depicts a battery unit being installed in a battery receptacle.
Figure 5:
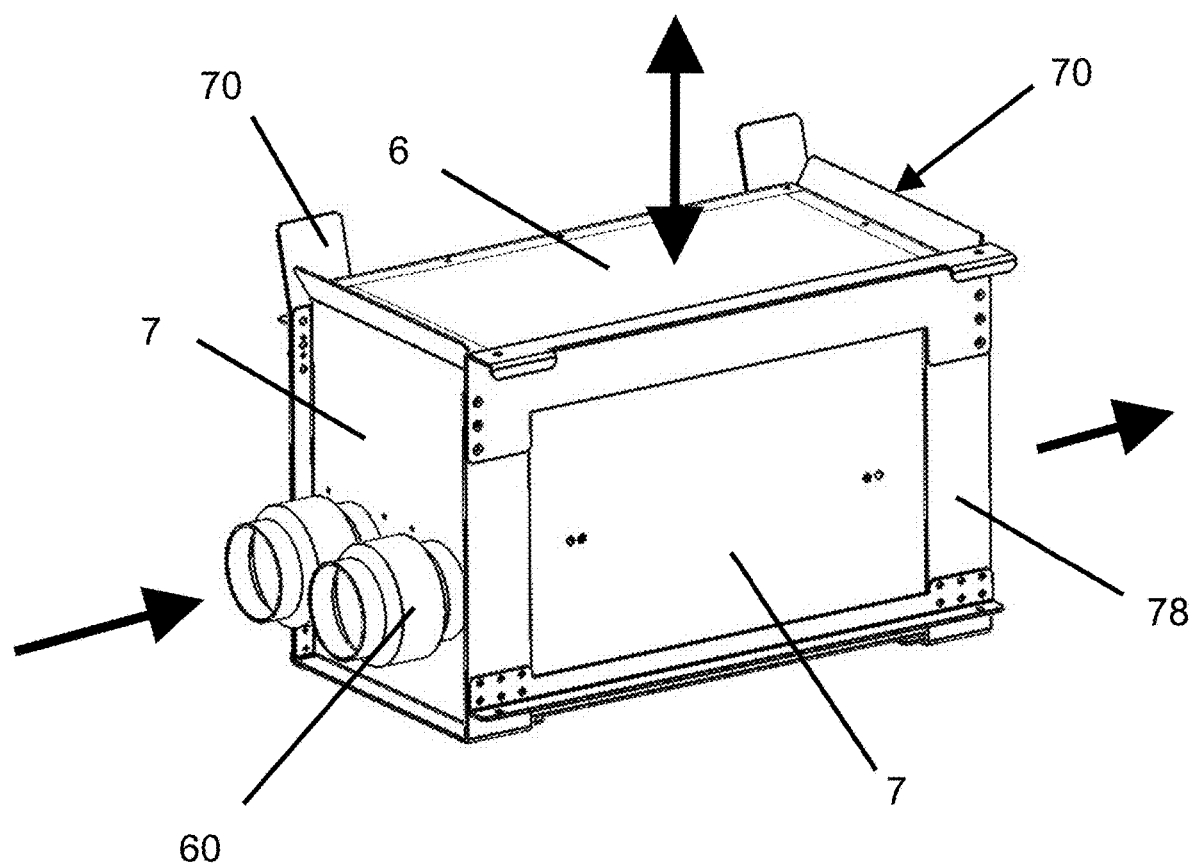
FIG. 5 illustrates a battery unit in position in a battery receptacle.

FIGS. 4 and 5 provide further views of the battery swap operation, required when a battery needs to be replaced with a freshly charged battery. The battery assembly 6 is lowered into the battery receptacle 7 with a lift bracket 5 that is connected to the winch mechanism through a lifting hook 3. As the battery enclosures 6 are lowered into the battery receptacles 7, the battery enclosures 6 are guided by lead-in tabs 70 so that they drop easily into the receptacles 7. The lead-in tabs 70 on the battery receptacle 7 urge the battery enclosure 6 toward the interior of the battery receptacle 7.

Also visible in FIGS. 4 and 5 are blowers 60 that force cooling fluid through the battery enclosures 6. It is envisioned that at least one blower 60 will be associated with each of the battery assembly 6 and battery receptacle 7 combinations. This configuration allows a cooling fluid to be injected into the cooling system. Cooling is a critical feature for the batteries and the electric motors of the electric race car 1. Because of the importance of cooling in the machine, it is envisioned that any one of, or combination of, a number of cooling systems may be employed in the race car 1. Suitable cooling media include, but are not limited to, air, water, air and water as a mist, liquid nitrogen, and carbon dioxide.

In various embodiments, for external motor cooling, a typical cooling system would utilize air and water mist. For internal motor cooling, preferred embodiments would typically utilize liquid nitrogen or carbon dioxide. In many embodiments, the battery cooling system would use an air and water mist.

Figure 6:
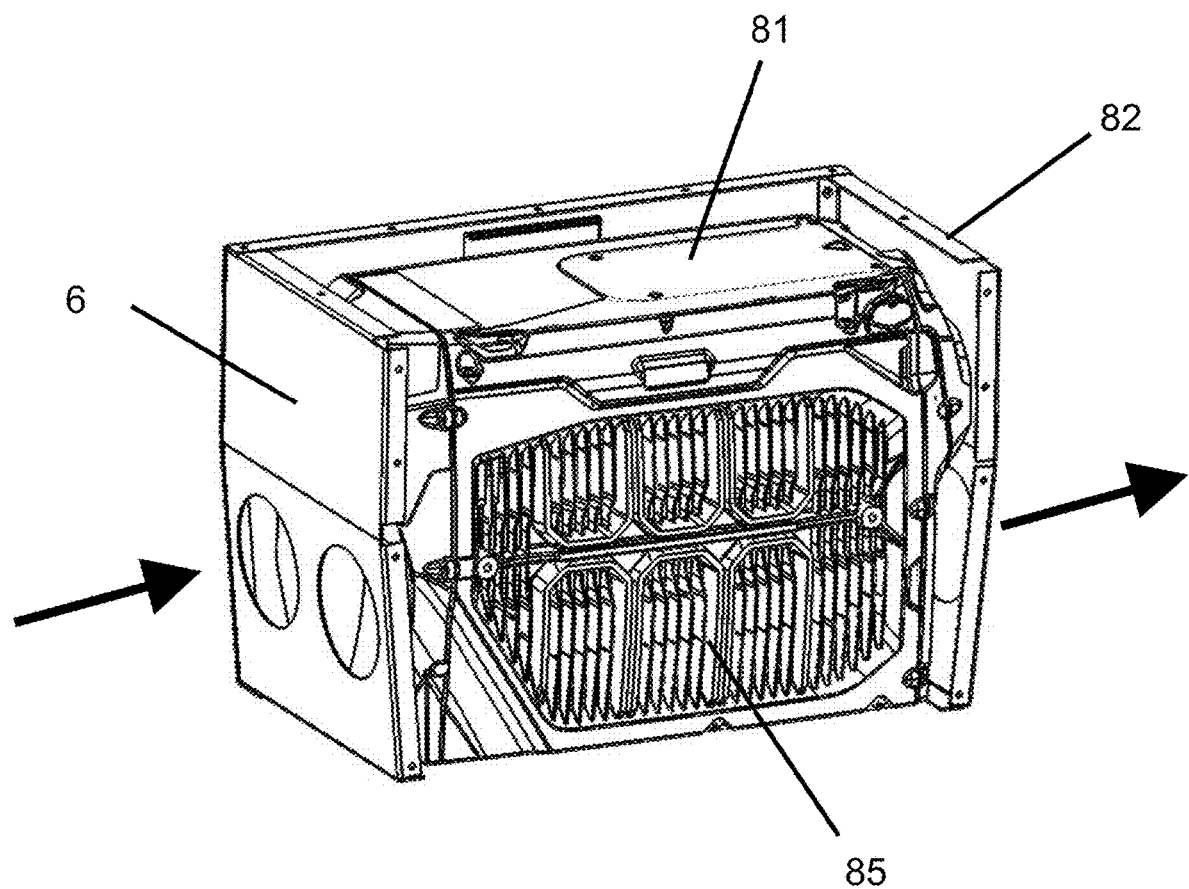
FIG. 6 shows a battery unit in a battery receptacle with a side panel removed to expose a cooling system mechanism.

FIG. 6 shows further components of the race car 1. One or both of the side panels of the battery enclosure assembly 6 may include a plurality of cooling fins 85 that transfer heat from the battery enclosure 6 away from the battery. Also shown in FIG. 6 is an electronics control module 81 that controls the functions of the race car 1. The electronics include battery management, charging and discharge control, and a motor controller for each motor. The battery management and motor controllers can be independent, or a pair of batteries/motors could be controlled by one master control system.

Figure 7:
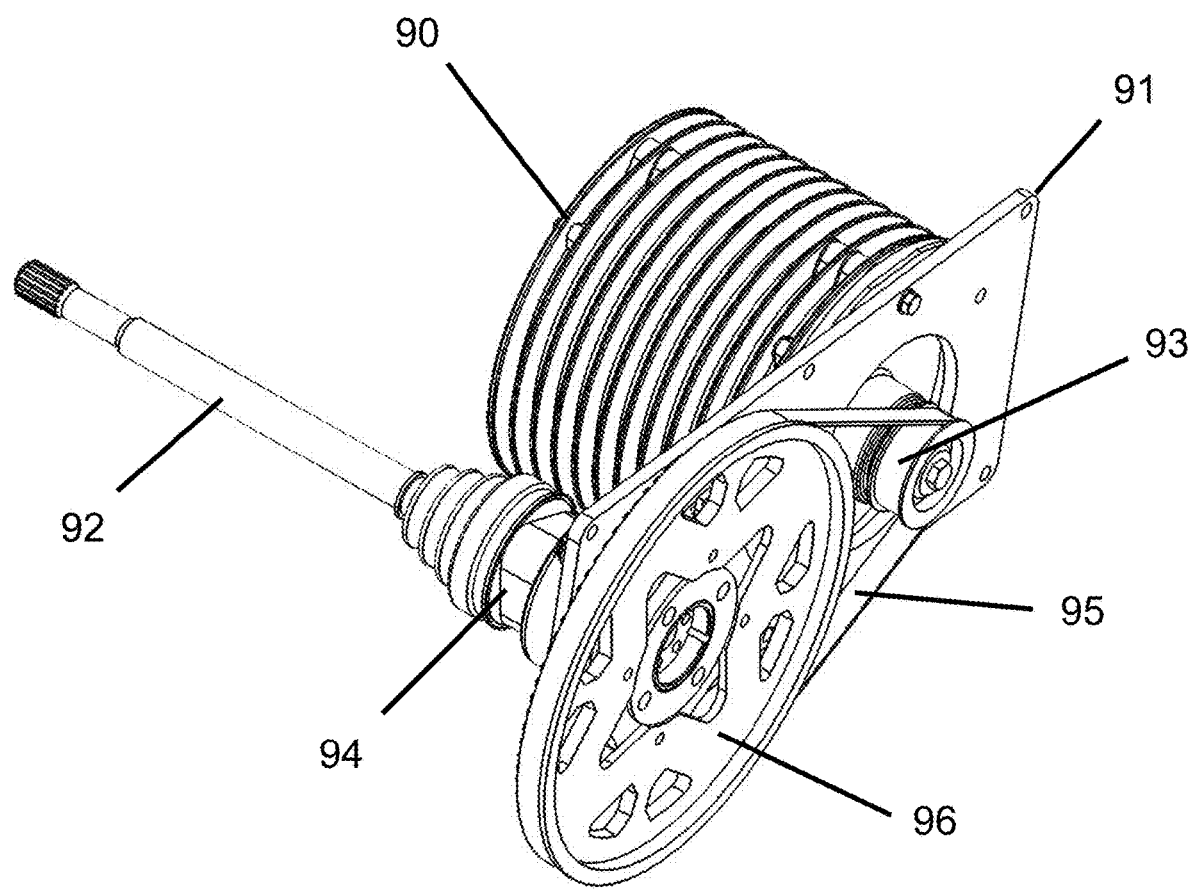
FIG. 7 is a perspective view of a motor drive assembly with a belt drive and a CVD (constant velocity drive) joint that are associated with each belt driven electric motor.

FIG. 7 illustrates an exemplary motor drive assembly that may be used in the race car 1 of the present invention. In various embodiments, a motor mounting plate 91 supports an electric motor 90. The electric motor 90 rotates a driving pulley 93. The driving pulley 93 is in physical communication with a driven pulley 96. In belt driven embodiments, a belt 95 is the connecting means between the driving pulley 93 and the driven pulley 96. (A chain driven embodiment is described below.) The driven pulley 96 is connected to a constant velocity joint 94, which is in turn connected to a drive axle 92. The drive axle rotates a second constant velocity joint 94 which in turn drives the rear wheels.

It should be noted that the construction disclosed herein could be applied to a race car with the power being directed to the front wheel, or to all wheels, so that the vehicle would be a front wheel drive or an all-wheel drive vehicle. In these embodiments, the car could utilize one, two, three, or four battery/electric motor combinations.

Figure 8:
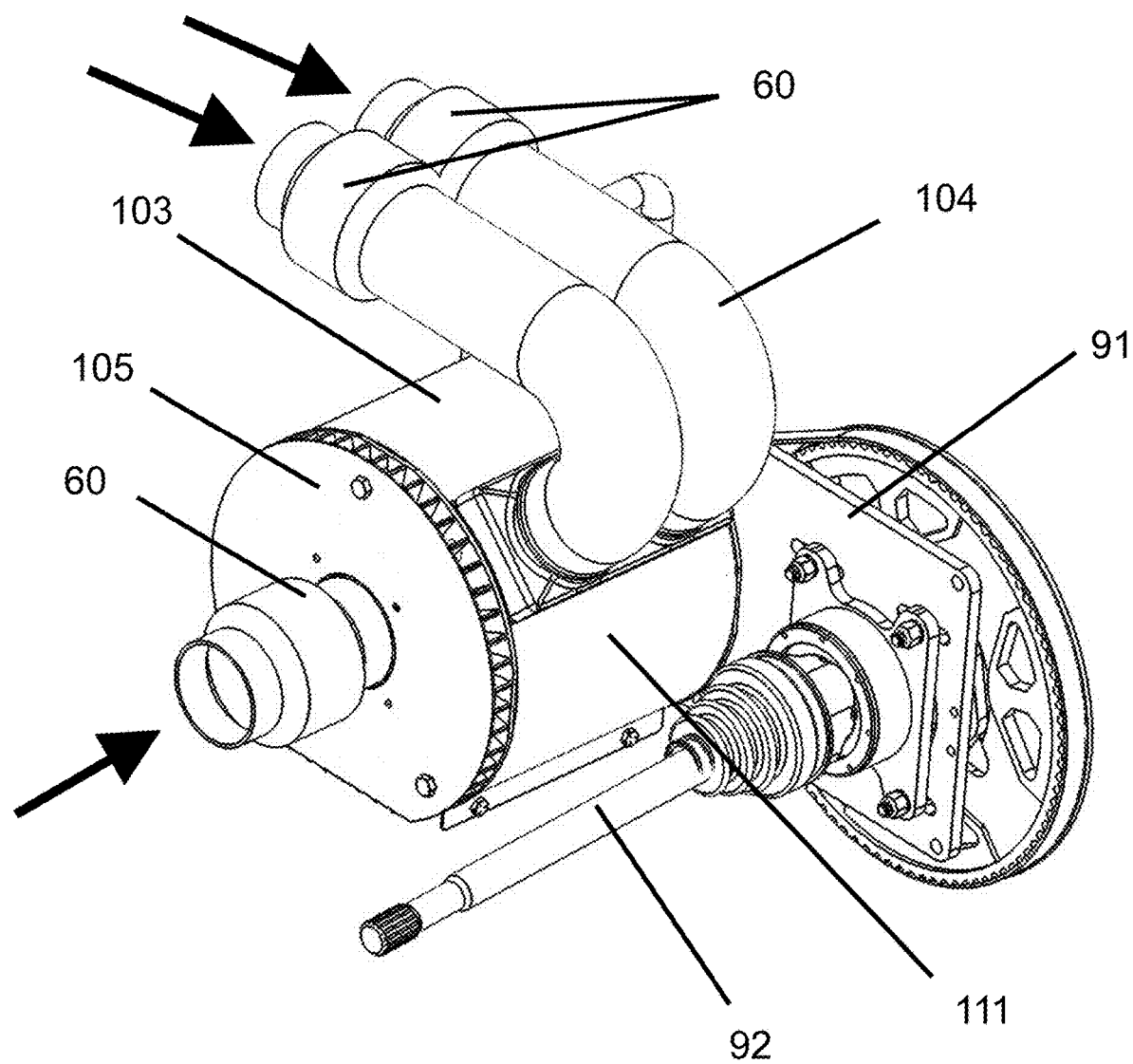
FIG. 8 is a left rear perspective view of an engine cooling system.
Figure 9:
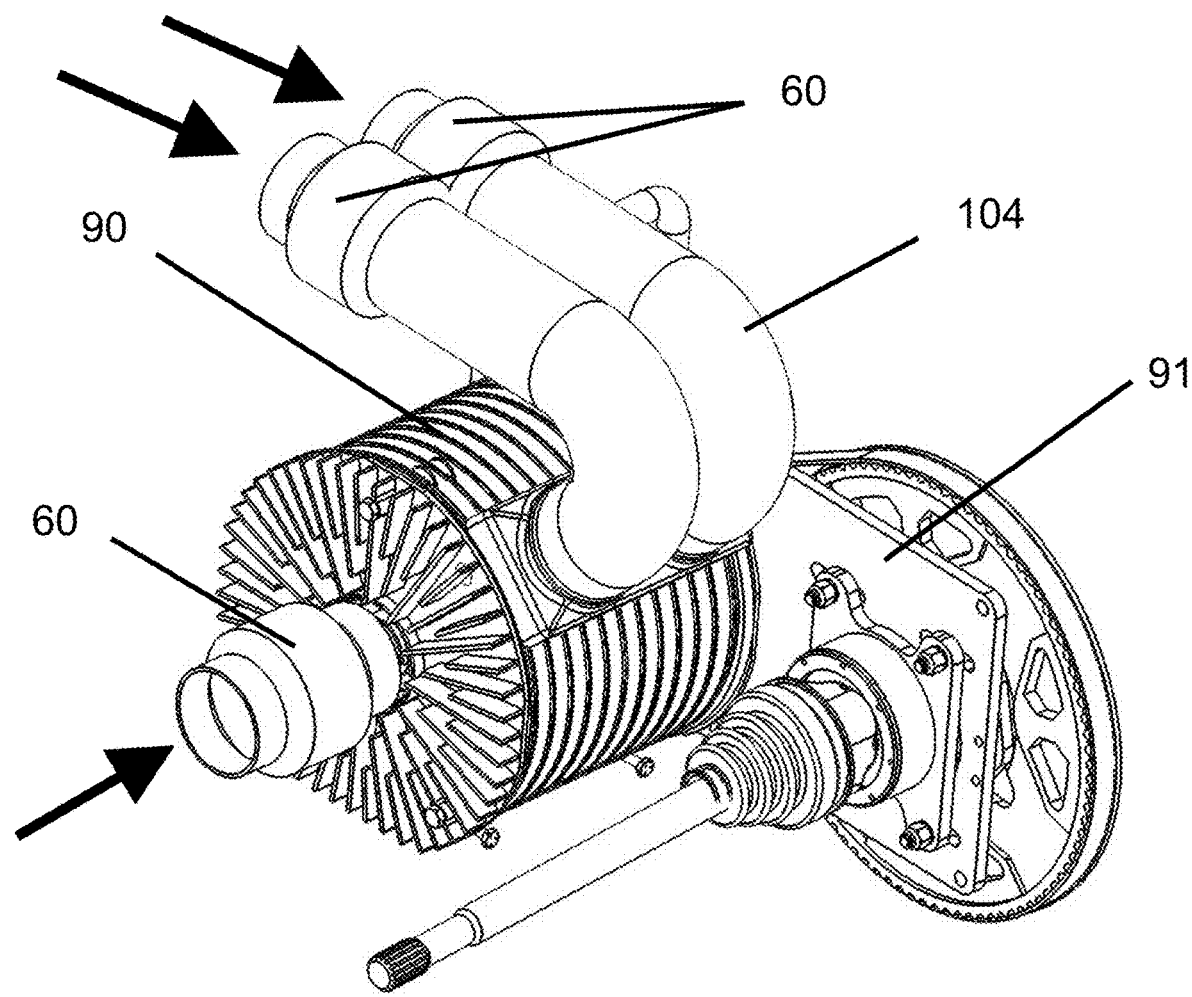
FIG. 9 shows the cooling system with the shroud removed.
Figure 10:
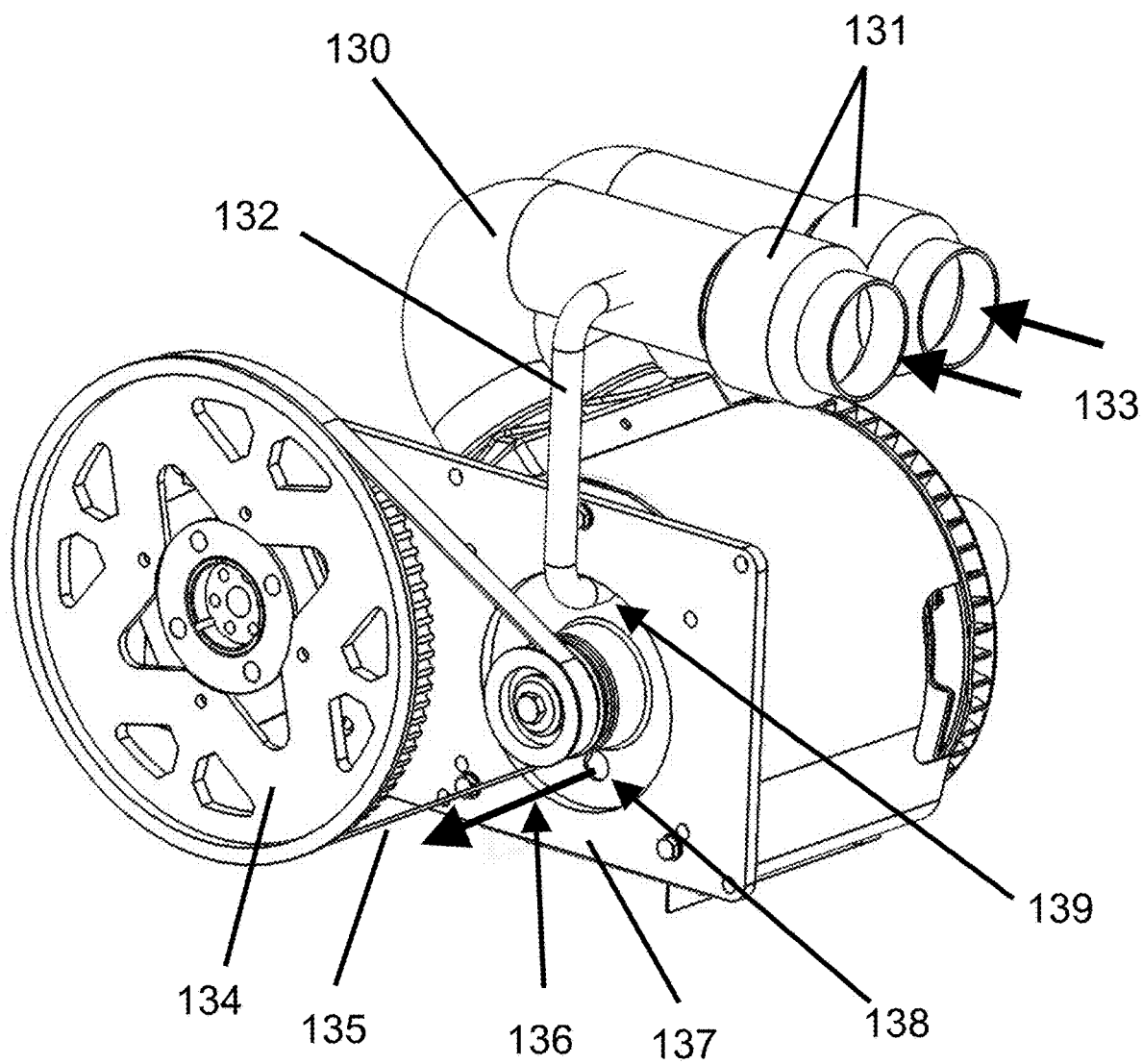
FIG. 10 illustrates a right front perspective view of the cooling system.

FIGS. 8-13 show various acceptable configurations of cooling systems for the race car 1. FIGS. 8-10 illustrate a motor cooling system. In some embodiments, a pair of air blowers 60 is mounted on a top side of the motor 90. The blowers 60 force air through ducts 104 and across the motor 90. A third blower 60 forces air across the motor 90 from a side. As shown in FIG. 8, the motor 60 is typically covered by a shroud formed from a top section 103, a front section 111, and a side section 105. FIG. 9 shows the cooling system with the shroud removed, and FIG. 10 shows the system from a front perspective view.

Figure 11:
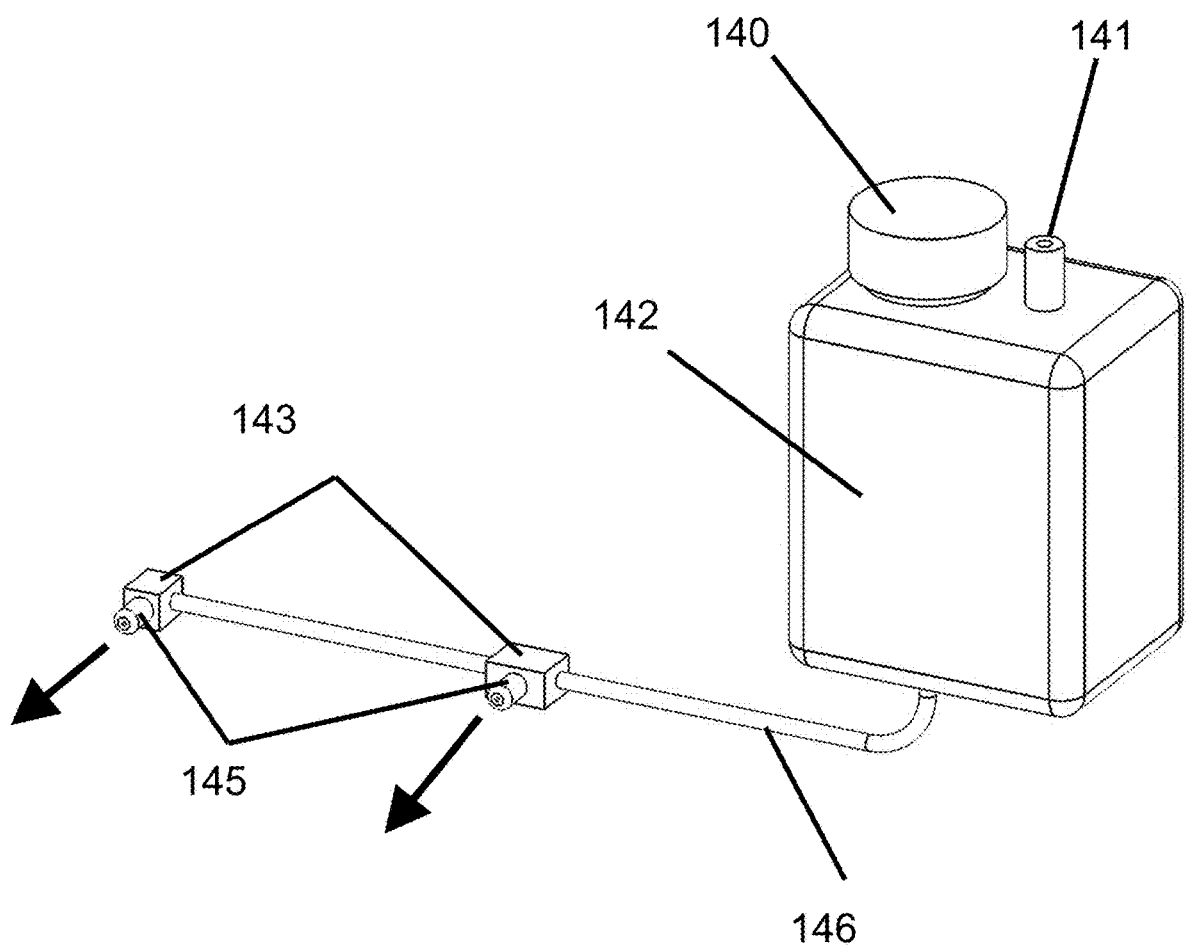
FIG. 11 shows the supply elements of a mist cooling system.
Figure 12:
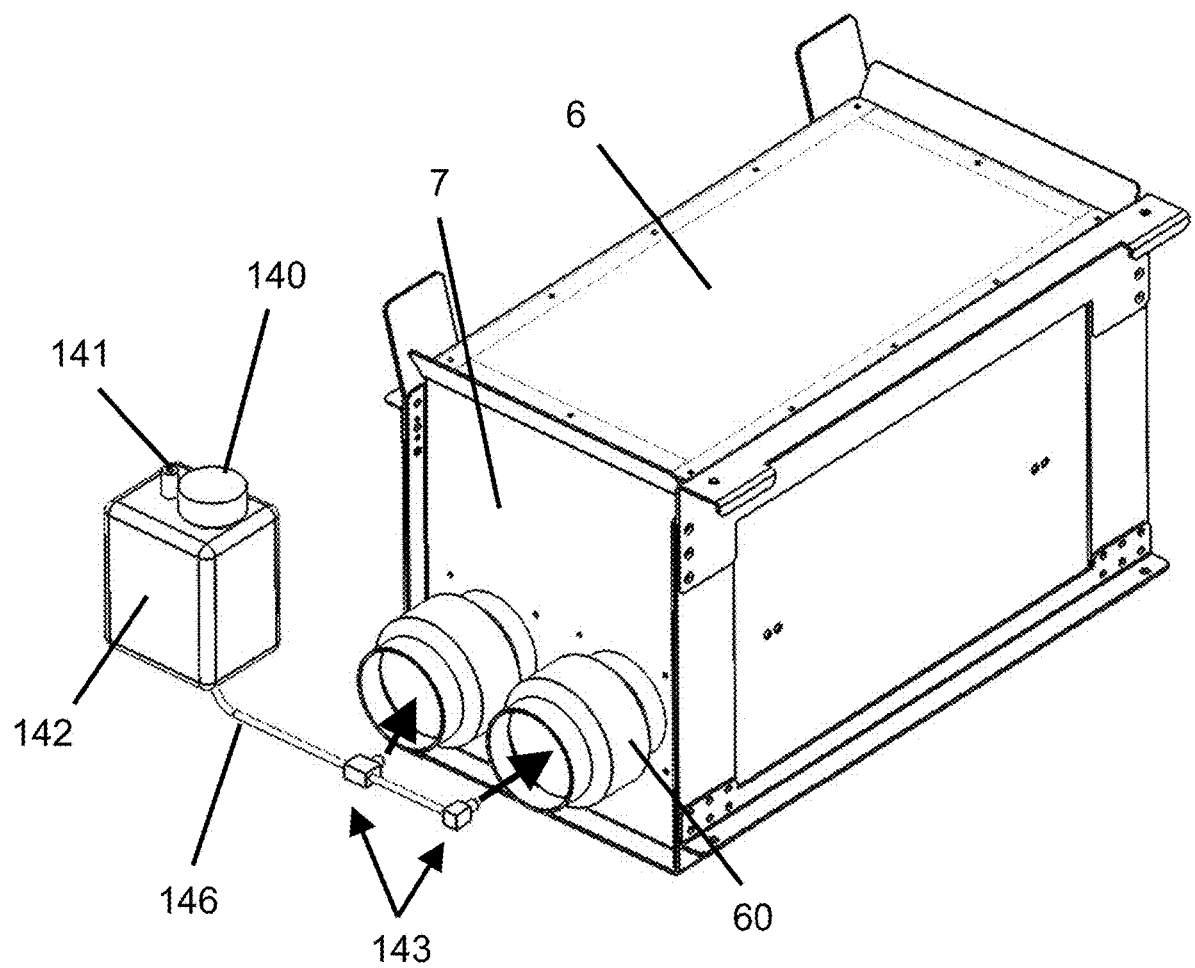
FIG. 12 shows a mist battery cooling system in position to cool a battery unit.
Figure 13:
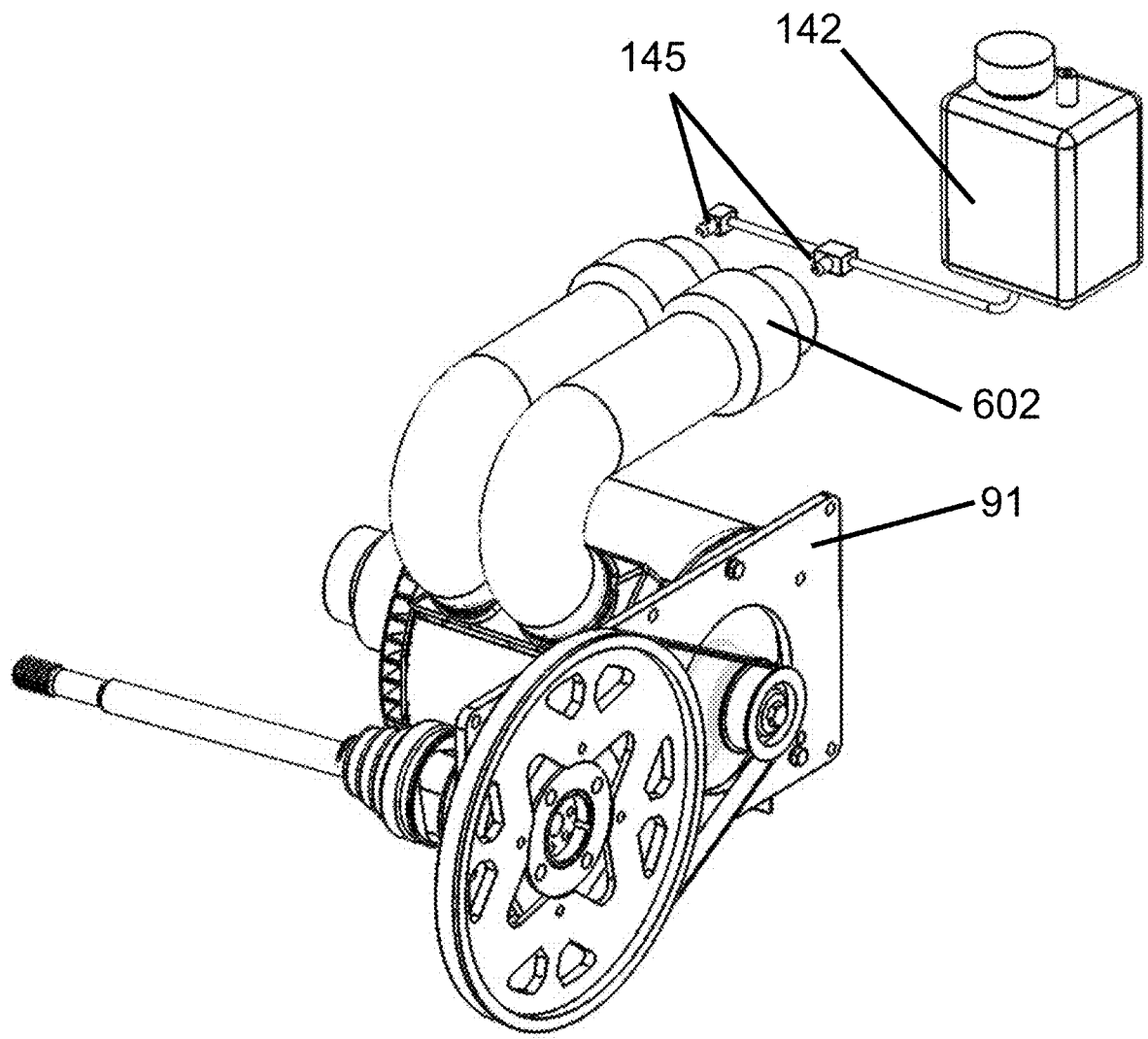
FIG. 13 shows a mist motor cooling system.

FIGS. 11-13 show a configuration for a pressurized mist cooling system utilized in various embodiments of the race car 1. The components of the misting system are illustrated in FIG. 11. The misting system includes a pressurized water tank 142 that is filled at a capped inlet 140. The system is charged via a one way air valve 141. A feed line 146 directs the mist through multiple fittings 143. Mist nozzles 145 are mounted on the fittings 143, and the nozzles spray the mist on the element to be cooled. FIG. 12 shows a misting system mounted on a battery. In various embodiments, the misting nozzles 145 spray water mist into the blowers 60 affixed to a battery enclosure 6. FIG. 13 shows the misting system deployed to cool a motor 90. The same general configuration is employed as that for the battery cooling deployment. This injection system for cooling fluids increases the efficiency of the cooling systems.

Figure 14:
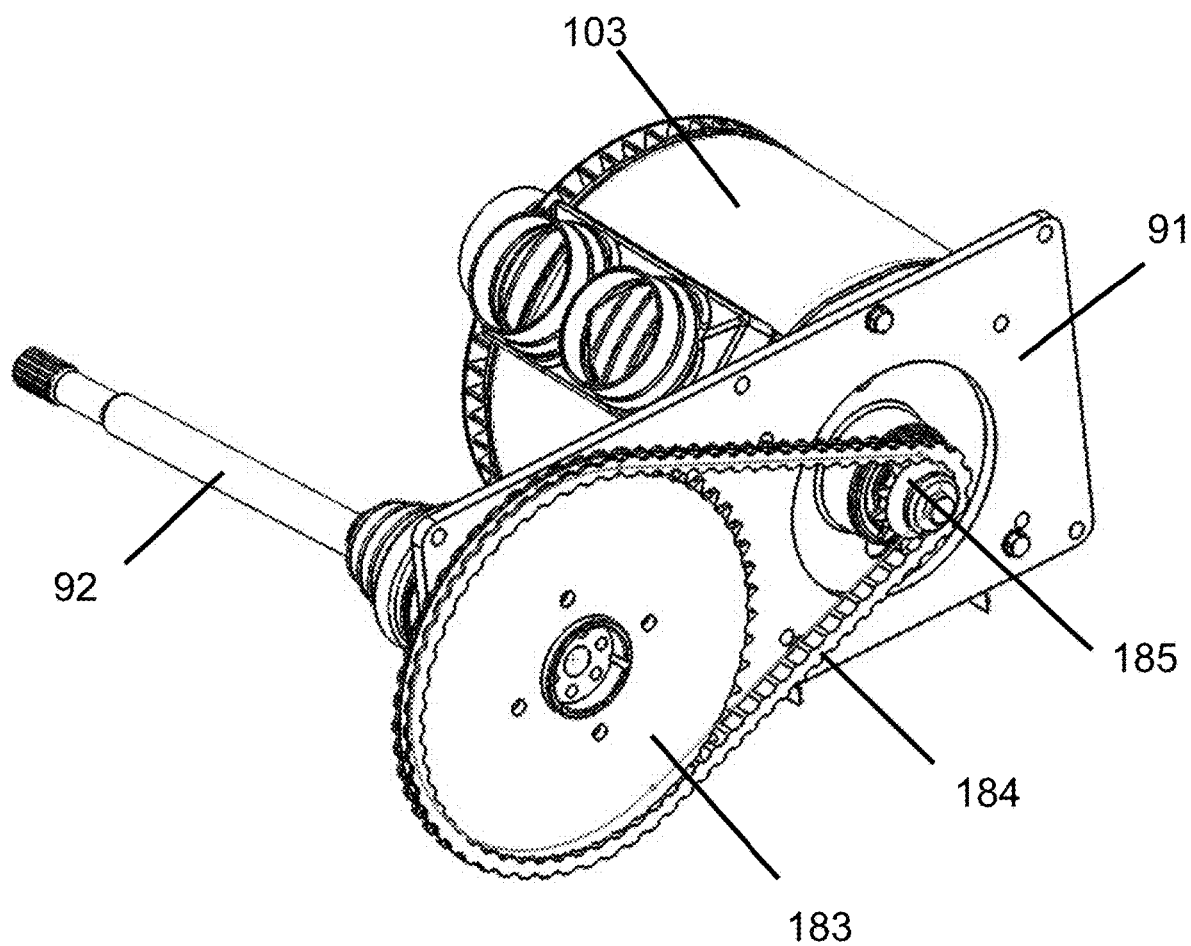
FIG. 14 is a perspective view of a chain drive system, with a chain drive and a CVD joint that are associated with each chain driven electric motor.

FIG. 14 shows a motor drive assembly with a chain drive substituted for a belt drive. In this configuration, a drive chain sprocket 185 is driven by the electric motor. A chain 184 is driven by the drive chain sprocket 185, and in turn drives a driven chain sprocket 183, which rotates a drive axle 92. The chain drive is lighter in weight as compared to a standard car drive train. When the belt drive system is utilized, the weight of the drive train is further reduced. A gear drive system could be utilized in place of a chain or belt, but is typically not preferred due to the added weight and complexity.

Figure 15:
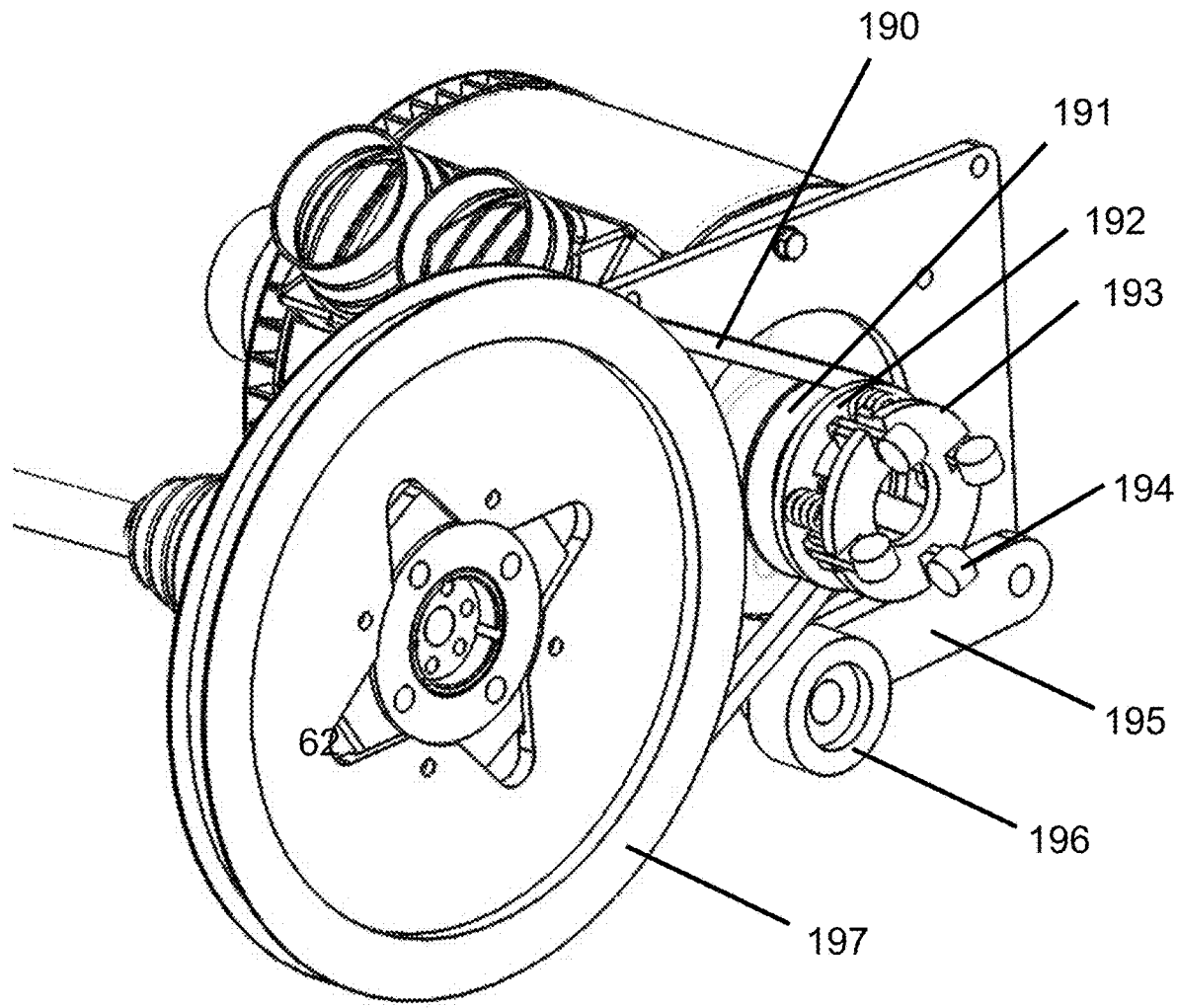
FIG. 15 is a detail view of a CVD mechanism.

FIG. 15 illustrates a CVD mechanism used in various embodiments. A V-shaped drive belt 190 (V belt 190) is powered by an inner grooved drive pulley 191. The drive pulley 191 rotates the V belt 190 which in turn rotates a driven pulley 197. The V belt 190 moves between the inner pulley 191 and an outer floating drive pulley 192. At high RPMs the V belt 190 may be moved to the outer pulley 192 by a spring retainer and cam arm support 193. The outer floating drive pulley 192 is moved in and out by the centrifugally activated cam arms 194 to change pitch diameter as the RPMs of the engine vary. An idler arm 195 with an idler pulley takes up slack in the V belt 190 as the drive pulley 191 changes pitch diameter.

Typically, electric drive cars do not have or need a gear ratio change. Due to the large dynamic range of speed changes in racing the ability to change the gear ratio of the drive system is advantageous. If a race car is geared with a high numerical ratio the car will perform best at lower speeds but poorly at high speeds. At high motor speeds, the motor drops off in torque and this loss of torque results in poor performance. If the car is geared with a low numerical ratio the car will perform better at higher speeds due to the delayed torque drop, but the low speed performance is compromised.

The CVD described is designed to increase the gear ratio only at higher speeds just before the motor torque starts to drop off. Current CVD's use two variable pitch "V" groove pulleys. The drive pulley changes pitch diameter as a function of speed change, and the driven pulley is spring loaded and changes pitch diameter to keep the belt tight.

In this design only the drive pulley changes pitch diameter and the slack controlled with a spring-loaded idler pulley. This approach reduces the number of complex parts and weight both important for a race car.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the Figures are merely schematic representations of the present disclosure. As such, some of the components may have been distorted from their actual scale for pictorial clarity.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various Figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

What is claimed is:

1. An electric race car comprising:
   at least two electrical power sources that each drive an associated electric motor, each rear wheel of the race car being powered by an associated one of the electric motors so that a twin drive system is created; and
   at least two receptacles that receive selected ones of the power sources, the receptacles including mechanisms to isolate the power sources from an interior of the vehicle and being oriented so that the power sources are received in the receptacles via vertical drop-in installation, the power sources being lowered into the receptacles from above such that no cover is involved in the installation process.

2. The car of claim 1, wherein a forced air cooling system is associated with at least one of the electrical power sources or at least one of the electric motors.

3. The car of claim 2, wherein a fluid is added to the air in the cooling system.

4. The car of claim 3, wherein the fluid is at least one of air, water, air and water as a mist, liquid nitrogen, and carbon dioxide.

5. The car of claim 1, wherein a drive train comprises a drive coupling between the electrical power source and the rear wheel, the drive coupling comprising a belt.

6. The car of claim 1, wherein a drive train comprises a drive coupling between the electrical power source and the rear wheel, the drive coupling comprising a chain.

7. The car of claim 1, wherein a drive train comprises a drive coupling between the electrical power source and the rear wheel, the drive coupling comprising a constant velocity drive joint.

8. An electric race car comprising:
   at least two electrical power sources that each drive an associated electric motor, each rear wheel of the race car being powered by an associated one of the electric motors so that a twin drive system is created;
   at least two receptacles that receive selected ones of the power sources, the receptacles including mechanisms to isolate the power sources from an interior of the vehicle and being oriented so that the power sources are received in the receptacles via vertical drop-in installation, the power sources being lowered into the receptacles from above such that no cover is involved in the installation process; and
   a forced air cooling system that is associated with at least one of the electrical power sources or at least one of the electric motors.

9. The car of claim 8, wherein a fluid is added to the air in the cooling system.

10. The car of claim 9, wherein the fluid is at least one of air, water, air and water as a mist, liquid nitrogen, and carbon dioxide.

11. The car of claim 8, wherein a drive train comprises a drive coupling between the electrical power source and the rear wheel, the drive coupling comprising a belt.

12. The car of claim 8, wherein a drive train comprises a drive coupling between the electrical power source and the rear wheel, the drive coupling comprising a chain.

13. The car of claim 8, wherein a drive train comprises a drive coupling between the electrical power source and the rear wheel, the drive coupling comprising a constant velocity drive joint.

14. The car of claim 8, wherein at least one of the electrical power sources or the electric motors is cooled by external air flow.

15. An electric race car comprising:
   at least four electrical power sources that each drive an associated electric motor, each wheel of the race car being powered by an associated one of the electric motors; and
   at least four receptacles that receive selected ones of the power sources, the receptacles including mechanisms to isolate the power sources from an interior of the vehicle and being oriented so that the power sources are received in the receptacles via vertical drop-in installation, the power sources being lowered into the receptacles from above such that no cover is involved in the installation process.

16. The car of claim 15, wherein a forced air cooling system is associated with at least one of the electrical power sources or at least one of the electric motors.

17. The car of claim 16, wherein a fluid is added to the air in the cooling system.

18. The car of claim 17, wherein the fluid is at least one of air, water, air and water as a mist, liquid nitrogen, and carbon dioxide.

19. The car of claim 15, wherein a drive train comprises a drive coupling between the electrical power source and rear wheel, the drive coupling comprising a belt.

20. The car of claim 15, wherein a drive train comprises a drive coupling between the electrical power source and a rear wheel, the drive coupling comprising a chain.

* * * * *